US006157457A

United States Patent [19]

Van Oosterom

[11] Patent Number: 6,157,457

[45] Date of Patent: Dec. 5, 2000

[54] COUNTING DEVICE FOR THE REMOTE COUNTING OF STACKED OBJECTS IN A STACK OF THIN OBJECTS, AS WELL AS A COUNTING METHOD USING A COUNTING DEVICE

[75] Inventor: Willem Van Oosterom, Groningen, Netherlands

[73] Assignee: Function Control Research B.V., Groningen, Netherlands

[21] Appl. No.: 09/068,588

[22] PCT Filed: Nov. 13, 1996

[86] PCT No.: PCT/NL96/00446

§ 371 Date: Jul. 14, 1998

§ 102(e) Date: Jul. 14, 1998

[87] PCT Pub. No.: WO97/18532

PCT Pub. Date: May 22, 1997

[30] Foreign Application Priority Data

Nov. 13, 1995 [NL] Netherlands .......................... 1001637

[51] Int. Cl.[7] .......................... G01N 21/55; G06M 11/00

[52] U.S. Cl. .......................... 356/445; 377/8

[58] Field of Search .......................... 356/445, 256, 356/372, 376, 237.1; 377/8

[56] References Cited

U.S. PATENT DOCUMENTS

| | | | |
|---|---|---|---|
| 4,650,991 | 3/1987 | Croset et al. | 356/381 |
| 4,677,682 | 6/1987 | Miyagawa et al. | 356/71 |
| 5,132,791 | 7/1992 | Wertz et al. | 356/237 |
| 5,381,224 | 1/1995 | Dixon et al. . | |

FOREIGN PATENT DOCUMENTS

| | | |
|---|---|---|
| 0 312 298 | 4/1989 | European Pat. Off. . |
| 0 524 349 | 1/1993 | European Pat. Off. . |
| 7417019 | 12/1974 | Netherlands . |

*Primary Examiner*—Frank G. Font
*Assistant Examiner*—Roy M. Punnoose
*Attorney, Agent, or Firm*—Jeffrey D. Myers

[57] ABSTRACT

A counting device that detects intensity differences in reflections coming from stacked thin objects. The device comprises a radiation source generating a radiation beam and a photoelectric detector detecting the intensity differences in the radiation reflected by the objects, and is provided with an optical pathway placed between the objects and the photoelectric detector. The optical pathway comprises a diaphragm having a diaphragm opening which, in relation to the dimension of the beam of reflected radiation reaching the diaphragm, is smaller.

9 Claims, 3 Drawing Sheets

COUNTING DEVICE FOR THE REMOTE COUNTING OF STACKED OBJECTS IN A STACK OF THIN OBJECTS, AS WELL AS A COUNTING METHOD USING A COUNTING DEVICE

BACKGROUND OF THE INVENTION

1. Field of the Invention (Technical Field)

The invention relates to a counting device for the remote counting of stacked objects in a stack of thin objects such as carton sheets, comprising a radiation source for the generation of a radiation beam, means for moving the radiation beam along the transverse edges of the stacked objects, photoelectric detection means for the detection of the intensity differences in radiation reflected by the irradiated stacked objects, as well as optical means placed between said stacked objects and said photoelectric detection means.

2. Background Art

A counting device of the above-mentioned kind for courting a stack of corrugated board is known from the Dutch patent specification No. 167,530 as well as from the U.S. patent specification 3,581,067, referred to therein.

The latter patent specification reports that during the vertical scanning of the stack the charges in reflection behaviour occurring between the separate layers are counted. It is the changes in brightness caused by the edge characteristics of the layers of material which follow in quick succession, that are counted, while slow changes in the mean brightness of the material are ignored. The faster horizontal scanning periodically applied serves to determine the mean brightness over a larger horizontal width. To count the corrugated boards, the scanning light beams are directed onto the end face of the stack at an angle in order to obtain a mean brightness value which is independent of whether or not the light beam happens to fall on the front of a carton. The disadvantage of this method is that a slight change in brightness between the adjacent layers will cause faulty counting. The reason for there being so little change in brightness between adjacent layers may be that the material edges have generally poor reflection properties, or that the gap between the in themselves evenly reflecting layers, is too narrow. When counting the corregated boards by the known method, it is also possible that a split between two base sheets is counted as a layer.

The counting device described in the above-mentioned Dutch patent specification 167,530 uses a method in which a predetermined width of one end of the stack is at the same time scanned in a faster horizontal movement by means of a photoelectric sensor consisting of a horizontal group of photodiodes being switched through electric impulses alternately from one to the other end of the sensor, the impulses obtained are identified as coming from a flat base place when a series of connected impulses are detected, or from a corrugated plate of the corrugated board when a series of impulse groups is detected, or as coming from a split between adjacent corrugated boards when no signal is detected, and by means of a counting and reading device which is set at a base plate or zero detection so that a sheet of carton is counted if a certain number of impulse groups coming from the corrugated board is detected. The device used to carry out the above method is characterized in that elements represent for the provision of a narrow illuminated scanning zone of predetermined length, a group of photodiodes absorbing light reflected from the scanning zone and elements for successive excitation of the photodiodes, a base plate detector comprising a counter emitting a signal when a predetermined number of impulses generated by the photodiodes is counted, and in addition that a corrugated board detector is provided. The group of photodiodes may comprise for instance 64 photodiodes.

Another possibility applied in the known art involves the observance of the entire stack by means of a CCD camera, with a subsequent analyzation of the picture content.

The disadvantage of the method using the moving sensor is the complex construction of the mechanical part of the device, while the disadvantage of the method using a CCD camera is the relatively high cost of the CCD camera and the processing unit as well as the poor resolution.

It will be clear from the above that counting stacks of carton or stacks of other thin objects is technically not simple. The main reason for this is the relatively slight contrast between the reflection from the core and the reflection from the sides of the stacked objects when the counting device is not just used for counting sheets of corrugated board, but in particular also for solid carton, sheets of plastic foil and the like, where there are few or no openings in and/or between the sheets. In practice, the great variations in distance which often exist between the counting device and the stacks of objects to be counted also play a role because of the variations in sheet size with the stacks being moved on an aligned path along a fixed device. To avoid constantly having to move the counting device or the stacks of carton it is desirable to provide a counting device with a great focal depth. The deficient focal depth of the device of the known art has resulted in an increasingly complex counting device and in the addition of extra movements which increase the mechanic complexity of the device.

SUMMARY OF THE INVENTION (DISCLOSURE OF THE INVENTION)

It is the object of the invention to provide a device of the kind mentioned in the preamble may be mechanically simple and which results in a greater focal depth and is characterized in that said optic means comprise a diaphragm having a diaphragm opening, which diaphragm opening, in relation to the dimensions of the beam of reflected radiation in part of said radiation path between said optical means and said photoelectric detection means, is smaller. Surprisingly, even though the addition of the diaphragm blocks off a significant amount of the reflector of the already sparse light, the results is a marked improvement of the counting device. This is the effect of the greatly improved focal depth of the counting device.

The presence of the diaphragm creates a very small radiation spot by means of which intensity differences can be observed with a better resolution than previously. It is also an advantage that a diaphragm, in particular a diaphragm whose opening is not variable, is a simple element which is usually not expensive.

In practice an embodiment of the invention was of interest which was characterized in that said diaphragm has a diaphragm opening ranging from 0.1 $\mu$m to 10 $\mu$m.

It is further advantageous if this embodiment is characterized in that said diameter ranges from 0.25 $\mu$m to 2 $\mu$m. The importance of this will be explained below.

A simple embodiment of the invention is obtained with an embodiment characterized in that said photoelectric detection means comprises a single photoelectric cell. This embodiment contributes to the technical simplification of the device.

A further important contribution to improve the focal depth of the optical system of the device according to the invention can be realized by applying a preferred embodiment which is characterized in that said optical means comprise a lens system whose focal distance ranges from 4 mm to 50 mm, and is preferably about 25 mm.

Surprisingly, placing a lens, which for this purpose has a short focal distance, in the beam of reflected radiation in front of the diaphragm, promotes the device's desirable great increase in focal depth.

A further contribution may be provided by applying an embodiment which is characterized in that the radiation source is a monochromatic light source, such as a laser.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

Figure 1:
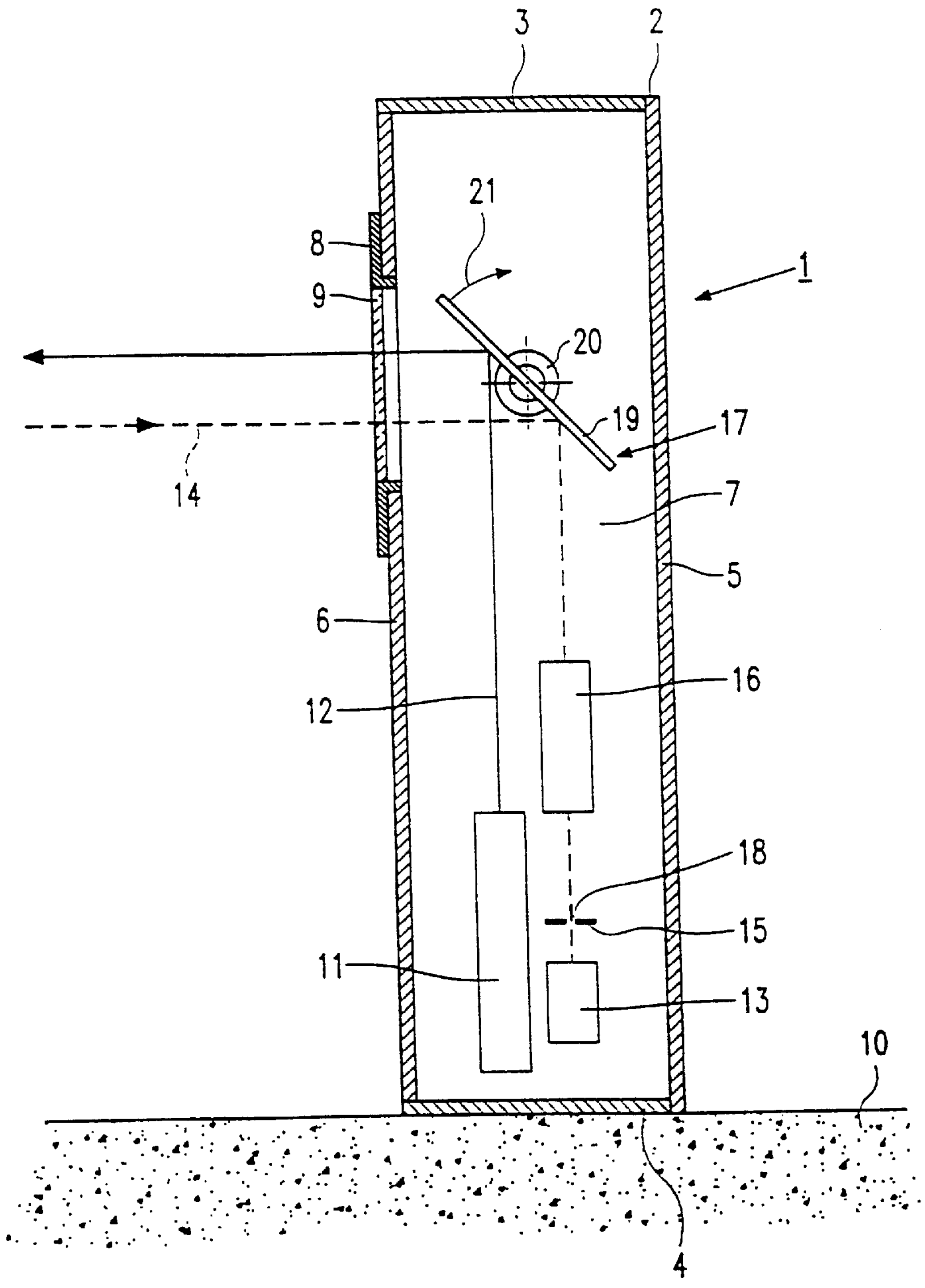
FIG. 1 shows a longitudinal cross-section of a counting device according to the invention standing on a floor in vertical position.

DESCRIPTION OF THE PREFERRED EMBODIMENTS (BEST MODES FOR CARRYING OUT THE INVENTION)

An embodiment of the invention suitable for stationary mounting and which can for instance be used for counting stacked objects such as separate sheets of carton in a stack of carton, is characterized in that the device is provided with a rotatable mirror to make the radiation beam move as a scanning beam over a certain scanning area, and the stack of objects can be placed within said scanning area so that the objects can be scanned by a moving radiation spot produced by the moving scanning beam.

An important consideration with the last-mentioned embodiment is, that if the device is provided with a rotating mirror, an extra difference in optical path length occurs because the distance between the counting device and the top and bottom of the stack is greater than the distance between the middle of the stack and the counting device. The improvement of the focal depth, which is the achievement of the invention, therefore greatly contributes to making the advantageous embodiment possible, in which the only movable part is the rotating mirror.

The invention not only relates to a counting device of the kind mentioned in the preamble but also to a method for counting a number of objects, in particular separate sheets of carton contained in a stack of carton, comprising the steps of: generating a radiation beam by means of a radiation source, moving the radiation beam in the form of a scanning beam over a particular scanning area, placing the objects within said scanning area such that a moving radiation spot produced by the moving scanning beam periodically scans the objects, absorbing the radiation coming from the scanning spot and reflected by the objects, directing the reflected radiation via a radiation path provided with optical means to photoelectric means and converting the detected intensity difference in reflected radiation and absorbed by the photoelectric means into an electric signal which is modulated by the intensity difference and quantifying the modulated signal, which quantification represents the number of scanned objects. As already mentioned, up to now the known methods involved complex and expensive devices while, in addition, the resolving power was not always entirely satisfactory. To this end the method according to the invention offers a solution and is characterized in that said radiation source, said optical means and said photoelectric means are mounted stationarily, the objects are brought within the scanning area, said scanning beam is moved by means of a movable optical means, said reflected radiation in said radiation path is partially blocked off by a diaphragm provided with a diaphragm opening, only the part of reflected radiation passing through the diaphragm opening is directed at said photoelectric means, and said part of the reflected radiation is directed at only one single photoelectric cell pertaining to the photoelectric means.

In the method according to the invention a stationarily mounted device is used possessing a great focal depth and a great resolving power. This allows good counting using a simple apparatus while, moreover, the positioning of the stacks of carton or other objects to be counted is not very critical.

With respect to the simplicity of the device used and also with respect to the counting device's sensitivity to intensity differences, an embodiment of the method is of consequence which is characterized in that the movable optical means is positioned in said radiation path of the reflected radiation, and that the reflected radiation absorbed by the photoelectric cell reaches the photo-electric cell via said movable optical means.

Figure 2:
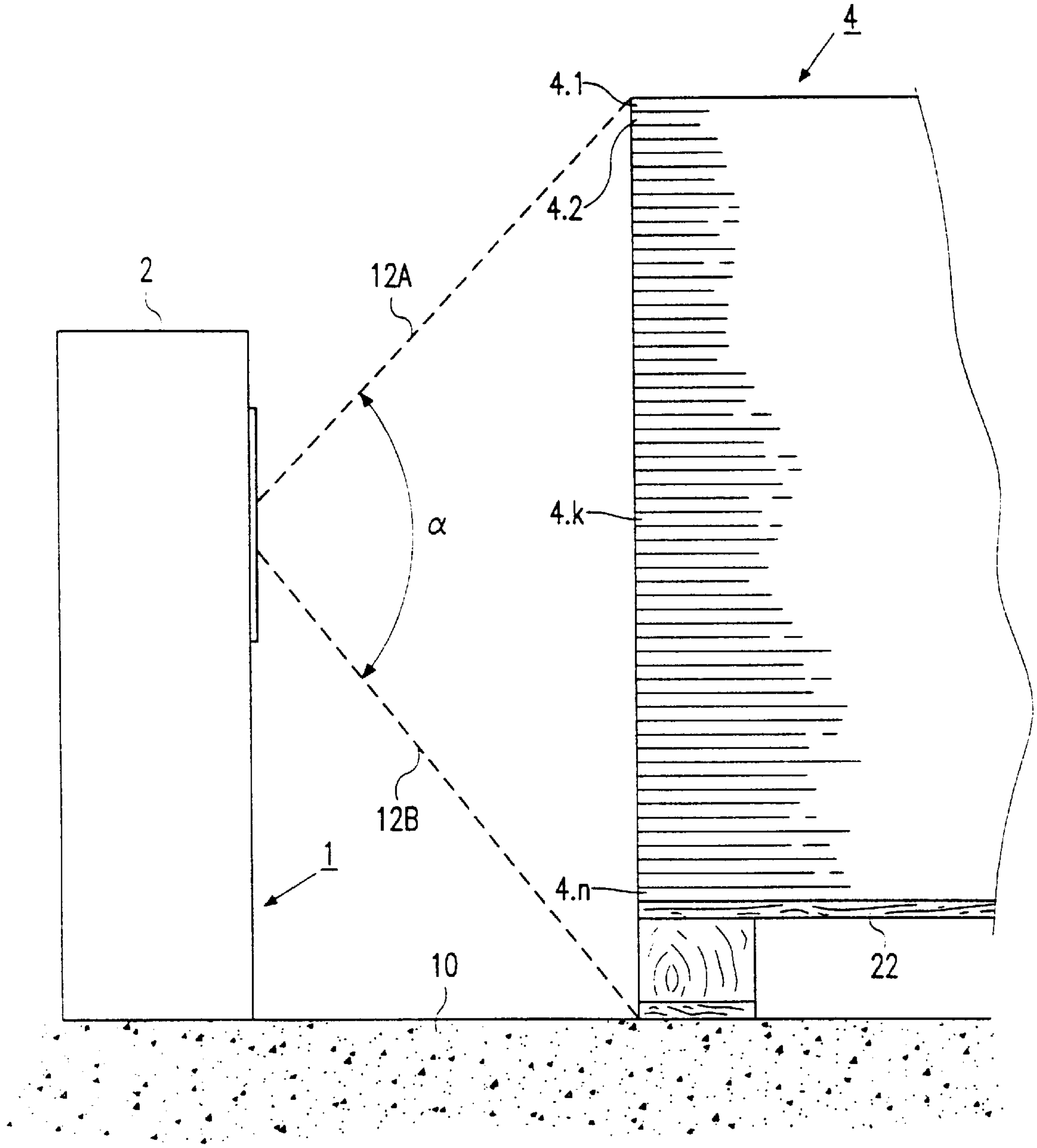
FIG. 2 shows a view of a counting device of the kind shown in FIG. 1 on another scale, standing on a floor next to a pallet loaded with carton.
Figure 3:
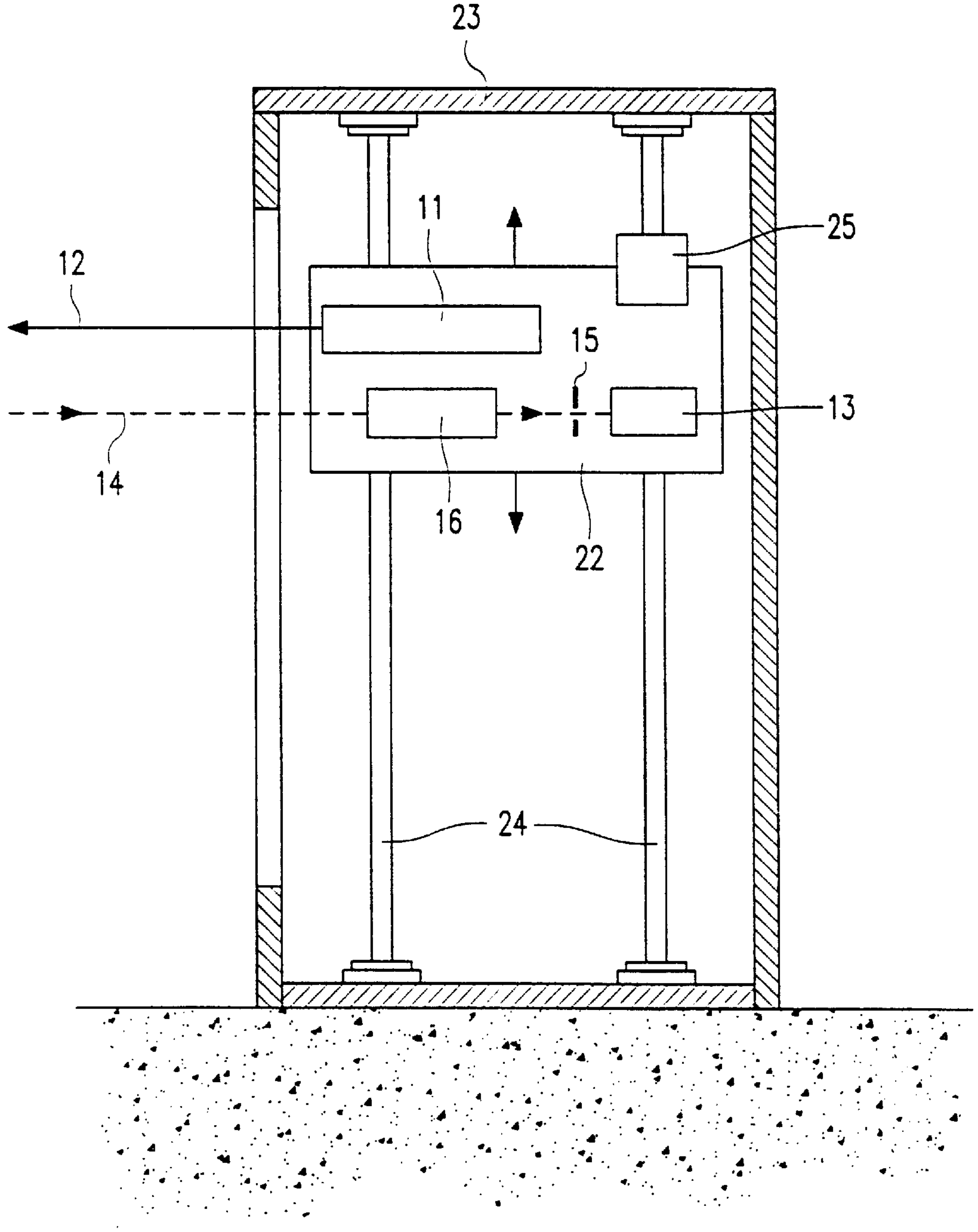
FIG. 3 shows a similar cross-section as FIG. 1 of an embodiment having a vertically translatory optical/electronic unit.

The invention will now be further explained with reference to the schematic drawing illustrating, merely as non-limiting example, some embodiments of the invention, in which:

FIG. 1 shows a longitudinal cross-section of a counting device according to the invention standing on a floor in vertical position;

FIG. 2 shows a view of a counting device of the kind shown in FIG. 1 on another scale, standing on a floor next to pallet loaded with carton; and FIG. 3 shows a similar cross-section as FIG. 1 of an embodiment having a vertically translatory optical/electronical unit.

The counting device 1 shown in the drawing serves for the electronic detection of differences in intensity. In the schematic embodiment shown, the counting device comprises a housing 2 which is in principle closed having a top wall 5, a floor 4, a rear wall 5, a front wall 5, and side walls 7, of which only one is shown in the drawing. In the front wall a window 8 is provided which may be closed by means of, for instance, a glass pane 9. The whole is built solid and dustproof, suitable for use in an industrial environment. The counting device may be firmly positioned vertically on a factory floor 10 and, if desired, may be fixed thereto by suitable means (not shown).

Inside the housing 2 a radiation source 11 (shown very achematically) is provided for the generation of a radiation beam of sufficient intensity. The radiation beam is represented by the central line 12. In addition to the radiation source for the generation of the radiation beam, the device is provided with photoelectric detection means, schematically indicated at 13, which serve to detect intensity differences in the radiation reflected by objects irradiated by the radiation beam. The reflected radiation is represented in the drawing by the reflected radiation beam's central line 14. The figures 15, 16 and 17 refer to optical means placed in the radiation path of said object, in this case the stack of carton 4, and the photoelectric detection means 13.

The optical means 15 consists of a diaphragm having a diaphragm opening 18, which diaphragm opening, in relation to the dimensions of the beam 14 of reflected radiation in the part of said radiation path between the option means 15–17 and the photoelectric detection means 13, is smaller. The other optical means comprise a lens system 16 and a rotating mirror 17. In the drawing the lens system 16 is shown schematically and may comprise one or more lens elements for the concentration of reflected radiation onto the diaphragm 15. The rotating mirror 17 comprises a bilaterally reflecting mirror element 19 as well as a driving motor 20 whose rotation axis is positioned at right angles to the plane of the drawing. The mirror element 19 is rotated in the direction represented by the arrow 21 by means of the motor 20 at a velocity of, for example, 4 rotations per second. The rotating mirror 17 provides the radiation beam 12 with a scarring movement which is at least suitable for scanning a stack of carton 4. As shown in FIG. 2, the radiation beam 12 thus moves in vertical direction at least between two extreme positions 12*a* and 12*b* including a scanning angle α.

The diaphragm 15 is a small hole, a so-called "pin-hole", having a diaphragm opening of between 0.1 μm and 10 μm. Practice has shown that a preferred range of dimensions lies between 0.25 μm and 2.0 μm. The photoelectric detection means 13 comprise only one single photoelectric cell, the focal distance of the lens system 16 ranges from 4 mm to 50 mm, being preferably 25 mm. The effect of using a lens system having a short focal distance and a diaphragm having a small opening is that a pixel-like element is created on the photoelectric cell 13, facilitating the perception of intensity differences with a high resolution. Due to the fact that the lens has a short focal distance, the high resolution is accompanied by a great focal depth.

Thanks to the high resolution, objects of little thickness such as sheets of solid carton or paper can be counted. For counting solid carton a diaphragm opening of 2 μm is used. For counting the thinner duplex carton, 1 μm is used and for counting paper, 0.25 μm is used.

The radiation source 11 may, for instance, be provided by a monochromatic light source such as a laser. Lasers are particularly suitable for the generation of monochromatic light in a narrow, concentrated beam and for this reason they are particularly suitable for the present device. The radiation beam 12 is moved in the form of scanning ray over the scanning area α by means of the rotating mirror 17. The stack of carton 4 may be placed with little precision on an ordinary pallet 22 within said scanning area, to allow the end face of the separate sheets of carton 4.1, 4.2, . . . , 4.*n* to be scanned by a movable light spot (not shown in the drawing) produced by the movable scanning beam 12.

The photoelectric cell 13 is coupled (in a manner not shown) with electronic evaluation means (not shown, but known in themselves) which are suitable for the conversion of detected intensity differences in the reflected radiation absorbed by the photoelectric cell into an electric signal modulated by the intensity differences and quantifying the modulated electric signal, which quantification represents the number of scanned objects, being in this case the number of scanned sheets of carton 4.1, 4.2, . . . , 4.*n*. The rotating mirror 17 is also used to direct the reflected radiation 14 at the lens system 16 and thus ultimately at the diaphragm 15 and the photoelectric cell 13.

Although FIGS. 1 and 2 only shown a single embodiment of the invention, other embodiments are also possible within the scope of the invention as defined by the claims. Depending on the operation conditions, other optical components may be added. For instance, a second lens may be used in the lens system for the collimation of the reflected beam. In principle other suitable radiation sources may also be used apart from a laser, for instance, a suitable light source. Further, as shown in FIG. 3, the use of a rotating mirror may be left out and instead, the entire optical/electronic unit comprising the radiation source 11, the lens system 16, the diaphragm 15 and the photodetector 13, together mounted onto a support element 22, may be moved vertically up and down. In this end the housing 23 comprises two bars 24 as parallel guide links. A motor 35 drives the support element in a usual manner, which is not detailed here. A vertical wall of the housing 23 is provided with a slot 25 to allow the emitted and reflected light beams 12 and 14 respectively, to pass through.

What is claimed is:

1. A counting device for the remote counting of stacked objects in a stack of thin objects, comprising a radiation source for the generation of a radiation beam along the transverse edges of the stacked objects, photoelectric detection means for the detection of the intensity differences in radiation reflected by the irradiated stacked objects, optical means placed between said stacked objects and said photoelectric detection means, characterized in that said optical means comprise diaphragm having a diaphragm opening, wherein the diaphragm opening, in relation to the dimensions of the beam of reflected radiation in a path of said radiation path between said optical means and said photoelectric detection means, is smaller.

2. A counting device according to claim 1, characterized in that said diaphragm has a diaphragm opening ranging from approximately 0.1 μm to approximately 10 μm.

3. A counting device according to claim 2, characterized in that said diameter ranges from approximately 0.25 μm to approximately 2 μm.

4. A counting device according to claim 1, characterized in that said photoelectric detection means comprise one single photoelectric cell.

5. A counting device according to claim 1, characterized in that said optical means comprise a lens system whose focal distance ranges from approximately 4 mm to approximately 50 mm, and is preferably about 25 mm.

6. A counting device according to claim 1 characterized in that the radiation source is a monochromatic light source.

7. A counting device according to claim 1 characterized in that the counting device is provided with a rotatable mirror to make the radiation beam move as a scanning beam over a certain scanning area, and the objects can be placed within said scanning area so that the objects can be scanned by a moving radiation spot produced by the moving scanning beam.

8. A method for counting a number of objects, in particular the number of objected contained in a stack, such as the number of separate sheets of carton contained in a stack of carton, comprising the steps of:

generating a radiation beam by means of a radiation source, moving the radiation beam in the form of a scanning beam over a certain scanning area, placing the objects within said scanning area such that a moving radiation spot produced by the moving scanning beam periodically scans the objects, absorbing the radiation coming from the scanning spot and reflected by the objects, directing the reflected radiation via a radiation path provided with optical means to photoelectric means and converting the detected intensity difference in reflected radiation and absorbed by the photoelectric means into an electric signal which is modulated by the intensity differences, and quantifying the modulated signal, wherein the quantification represents the number of scanned objects, characterized in that said radiation source said optical means and said photoelectric means are mounted stationarily, the objects are brought within the scanning area, said scanning beam is moved by means of a moveable optical means, and said reflected radiation in said radiation path is partially blocked off by a diaphragm provided with a diaphragm opening, only the part of reflected radiation passing through the diaphragm opening is directed at said photoelectric means, and said part of the reflected radiation is directed at only one signal photoelectric cell pertaining to the photoelectric means.

9. A method according to claim 8 characterized in that the movable optical means is placed in said radiation path of the reflected radiation and the reflected radiation absorbed by the photoelectric cell reaches the photoelectric cell via said movable optical means.

* * * * *